US010760453B2

(12) United States Patent
Hirayama et al.

(10) Patent No.: US 10,760,453 B2
(45) Date of Patent: Sep. 1, 2020

(54) FEEDWATER SYSTEM OF COMBINED CYCLE POWER PLANT

(71) Applicant: KABUSHIKI KAISHA TOSHIBA, Minato-ku (JP)

(72) Inventors: Kento Hirayama, Yokohama (JP); Manabu Hasegawa, Yokohama (JP); Shinichi Terada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 556 days.

(21) Appl. No.: 15/459,263

(22) Filed: Mar. 15, 2017

(65) Prior Publication Data

US 2017/0268383 A1 Sep. 21, 2017

(30) Foreign Application Priority Data

Mar. 18, 2016 (JP) .................................. 2016-055376

(51) Int. Cl.
| | | |
|---|---|---|
| *F01K 1/00* | (2006.01) | |
| *F01K 11/02* | (2006.01) | |
| *F01K 13/00* | (2006.01) | |
| *F01K 13/02* | (2006.01) | |
| *F02C 6/18* | (2006.01) | |

(52) U.S. Cl.
CPC ............ *F01K 11/02* (2013.01); *F01K 13/006* (2013.01); *F01K 13/02* (2013.01); *F02C 6/18* (2013.01); *Y02E 20/16* (2013.01)

(58) Field of Classification Search
None
See application file for complete search history.

(56) References Cited

U.S. PATENT DOCUMENTS

| | | | | |
|---|---|---|---|---|
| 6,109,020 A | * | 8/2000 | Liebig ................... | F01K 23/106 60/39.182 |
| 6,343,570 B1 | * | 2/2002 | Schmid ................. | F01K 23/106 122/7 R |
| 2011/0318223 A1 | | 12/2011 | Miyazaki et al. | |

FOREIGN PATENT DOCUMENTS

| | | |
|---|---|---|
| JP | 9-88515 A | 3/1997 |
| JP | 2001-514368 A | 9/2001 |
| JP | 2005-313116 | 11/2005 |
| JP | 2005-313116 A | 11/2005 |
| JP | 5651580 | 1/2015 |

* cited by examiner

*Primary Examiner* — Todd E Manahan
*Assistant Examiner* — Katheryn A Malatek
(74) *Attorney, Agent, or Firm* — Oblon, McClelland, Maier & Neustadt, L.L.P.

(57) ABSTRACT

A combined cycle power plant feedwater system includes: a feed pump which supplies feedwater to a heat recovery steam generator; a first pipe which extracts part of the feedwater from a flow path in mid-course of pressurization of the feed pump; a first boiler supplied with the feedwater led into the first pipe and subjected to first water treatment; a second pipe where the feedwater discharged from a feed pump outlet flows; a second boiler supplied with the feedwater led into the second pipe and subjected to second water treatment more downstream than the flow path in mid-course of the pressurization; and a water-treating substance supply device which supplies a water-treating substance for the second water treatment to the feedwater flow path in the feed pump, at a position more downstream than a connection position of the first pipe and more upstream than a connection position of the second pipe.

7 Claims, 5 Drawing Sheets

US 10,760,453 B2

FEEDWATER SYSTEM OF COMBINED CYCLE POWER PLANT

CROSS REFERENCE TO RELATED APPLICATIONS

This application is based upon and claims the benefit of priority from Japanese Patent Application No. 2016-055376, filed on Mar. 18, 2016; the entire contents of which are incorporated herein by reference.

FIELD

Embodiments described herein relate generally to a feedwater system of a combined cycle power plant.

BACKGROUND

Combined cycle power plants have recently been used from a viewpoint of more efficient use of energy. A combined cycle power plant includes a gas turbine plant, a steam turbine plant, a heat recovery steam generator, a condensate and feedwater system, and adopts a power generation method using the combination of a gas turbine and a steam turbine.

In the heat recovery steam generator and the condensate and feedwater system, pipes where condensate and feedwater flow are provided. For the long-term stable operation of the combined cycle power plant, it is required to retard the corrosion of inner surfaces of the pipes. One example of a presently adopted solution for retarding the corrosion of the inner surfaces of the pipes is water treatment of the condensate and the feedwater flowing in the pipes.

In a heat recovery steam generator of a conventional combined cycle power plant, a circulation boiler having a drum is typically used. Feedwater supplied to the circulation boiler is subjected to AVT (All Volatile Treatment) which supplies a deoxidant such as hydrazine and a pH adjusting agent such as ammonia to the water. The all volatile treatment is water treatment that forms a magnetite coating film on an inner surface of a pipe to protect the pipe from corrosion. Boiler water of the circulation boiler is subjected to phosphate treatment which supplies phosphate to the boiler water.

In a once-through boiler, water highly purified by, for example, a demineralizer is subjected to OT (Oxygen Treatment) which supplies a pH adjusting agent and a minute amount of oxygen to the water. The oxygen treatment is water treatment that forms a hematite coating film on an inner surface of a pipe to protect the pipe from corrosion.

FIG. 5 is a system diagram schematically illustrating a feedwater system 300 of a conventional combined cycle power plant. This illustrates an example where the all volatile treatment is performed in the feedwater system 300.

As illustrated in FIG. 5, the feedwater system 300 includes: a water quality adjusting device 347 which adjusts the water quality of condensate; a feed pump 341 which supplies feedwater to a heat recovery steam generator; an intermediate/low-pressure feedwater system feed pipe 343 and a high-pressure feedwater system feed pipe 344 where the feedwater discharged from the feed pump 341 flows; circulation boilers 370a, 380a, an intermediate-pressure economizer 370b, and a low-pressure economizer 380b which are supplied with the feedwater through the intermediate/low-pressure feedwater system feed pipe 343; and a circulation boiler 360a and a high-pressure economizer 360b which are supplied with the feedwater through the high-pressure feedwater system feed pipe 344. The circulation boiler 360a and the high-pressure economizer 360b are in a high-pressure feedwater system 360, the circulation boiler 370a and the intermediate-pressure economizer 370b are in an intermediate-pressure feedwater system 370, and the circulation boiler 380a and the low-pressure economizer 380b are in a low-pressure feedwater system 380. The high-pressure feedwater system 360, the intermediate-pressure feedwater system 370, and the low-pressure feedwater system 380 are disposed in the order mentioned along the flow of gas turbine exhaust flowing in the heat recovery steam generator toward a stack 350.

The turbine exhaust supplied from a steam turbine plant of the combined cycle power plant is condensed to condensate in a condenser 338. The condensate in the condenser 338 is supplied to the feed pump 341 through a gland condenser 340 by a condensate pump 339. During this period, a basic substance is supplied to the condensate from the water quality adjusting device 347. Then, the alkalized feedwater is supplied from the feed pump 341 to the high-pressure feedwater system 360 through the high-pressure feedwater system feed pipe 344, and to the intermediate-pressure feedwater system 370 and the low-pressure feedwater system 380 through the intermediate/low-pressure feedwater system feed pipe 343. Then, the feedwater is supplied to the high-pressure economizer 360b and the circulation boiler 360a which are in the high-pressure feedwater system 360, the intermediate-pressure economizer 370b and the circulation boiler 370a which are in the intermediate-pressure feedwater system 370, and the low-pressure economizer 380b and the circulation boiler 380a which are in the low-pressure feedwater system 380, and is phosphated in the circulation boilers 360a, 370a, 380a.

DETAILED DESCRIPTION

Figure 1:
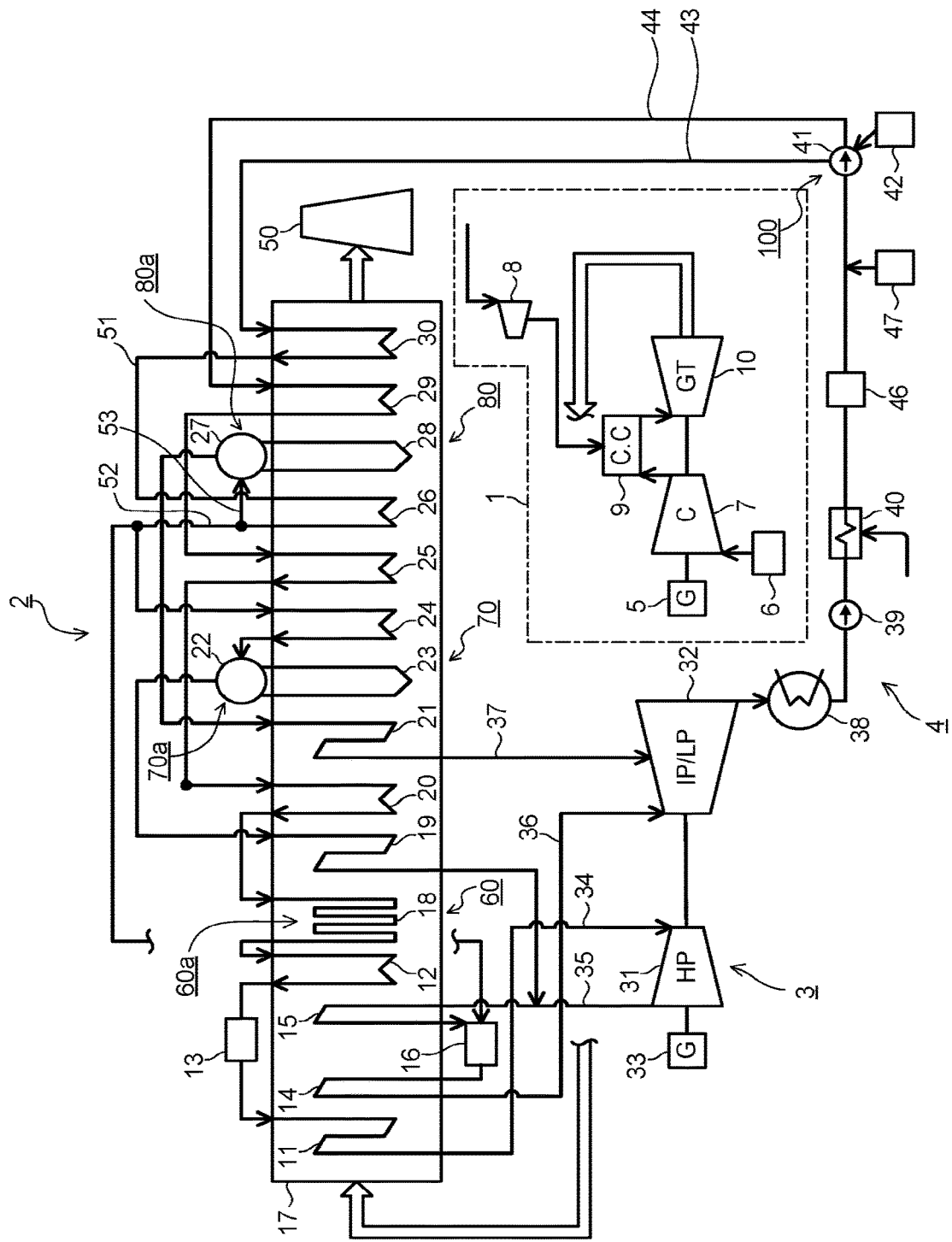
FIG. 1 is a system diagram schematically illustrating a combined cycle power plant including a feedwater system of a first embodiment.

With the recent increase in temperature and pressure as steam conditions in a heat recovery steam generator of a combined cycle power plant, using a once-through boiler in a high-pressure feedwater system of the heat recovery steam generator has been considered. However, in the once-through boiler replacing a circulation boiler drum provided in the high-pressure feedwater system, it is not possible to perform phosphate treatment as is performed in a conventional combined cycle power plant.

Applying the same water treatment method to a power plant including boilers of different types, in other words, a once-through boiler in its high-pressure feedwater system and circulation boilers in its intermediate/low-pressure feedwater system may cause various problems. For example, if oxygen treatment is applied to all the feedwater systems of the heat recovery steam generator, feedwater with a high oxygen concentration whose nonvolatile components are concentrated is supplied to evaporators of the circulation boilers provided in the intermediate/low-pressure feedwater system, and thus the circulation boilers are likely to corrode. If all volatile treatment is applied to all the feedwater systems of the heat recovery steam generator, a boiler differential pressure due to the growth of scale increases in the once-through boiler provided in the high-pressure feedwater system to decrease boiler efficiency. A necessary solution to the decrease of the boiler efficiency is chemical cleaning to remove the scale. Thus, the conventional water treatment method of applying the same water treatment to all the feedwater systems of the heat recovery steam generator is thought to have a difficulty in enabling the long-term stable operation of the combined cycle power plant including the heat recovery steam generator having boilers of different types.

It is an object of the embodiments to provide a feedwater system of a combined cycle power plant in which different water treatment methods can be applied in respective feedwater systems of a heat recovery steam generator.

A feedwater system of a combined cycle power plant of an embodiment is a feedwater system of a combined cycle power plant including: a gas turbine plant; a heat recovery steam generator which generates steam by using heat of exhaust of the gas turbine plant; and a steam turbine plant which is driven by the steam generated by the heat recovery steam generator. The feedwater system of the combined cycle power plant includes: a feed pump which supplies feedwater to the heat recovery steam generator; a first pipe which extracts part of the feedwater from a flow path in mid-course of pressurization of the feed pump; a first boiler which is in the heat recovery steam generator and supplied with the feedwater led into the first pipe and subjected to first water treatment; a second pipe where the feedwater discharged from an outlet of the feed pump flows; a second boiler which is in the heat recovery steam generator and supplied with the feedwater led into the second pipe and subjected to second water treatment at a position more downstream than the flow path in mid-course of the pressurization of the feed pump; and a water-treating substance supply device which supplies a water-treating substance for the second water treatment to the flow path of the feedwater in the feed pump, at a position of the feed pump more downstream than a position where the first pipe is connected and more upstream than a position where the second pipe is connected.

Embodiments will be hereinafter described with reference to the drawings.

First Embodiment

FIG. 1 is a system diagram schematically illustrating a combined cycle power plant including a feedwater system 100 of a first embodiment. The combined cycle power plant in the description here is a mufti-shaft combined cycle power plant, for instance, but the feedwater system 100 of the first embodiment is also applicable to a single-shaft combined cycle power plant.

As illustrated in FIG. 1, the combined cycle power plant includes: a gas turbine plant 1; a heat recovery steam generator 2 which generates steam by using heat of exhaust of the gas turbine plant 1; a steam turbine plant 3 which is driven by the steam generated by the heat recovery steam generator 2; and a condensate and feedwater system 4 which generates condensate by condensing exhaust of the steam turbine plant 3 and supplies feedwater to the heat recovery steam generator 2.

The gas turbine plant 1 includes a generator 5, an air compressor 7 including a plenum 6 at its inlet, a fuel gas compressor 8, a gas turbine combustor 9, and a gas turbine 10. The air (atmosphere) supplied from the plenum 6 is compressed to increase in pressure in the air compressor 7. The high-pressure air increased in pressure is supplied to the gas turbine combustor 9. The gas turbine combustor 9 generates combustion gas by burning the high-pressure air and fuel gas supplied from the fuel gas compressor 8. The combustion gas performs expansion work in the gas turbine 10, and motive power (rotational torque) generated at the time of the expansion work drives the generator 5. Then, the gas turbine exhaust (waste heat) having finished the expansion work is supplied to the heat recovery steam generator 2 to be used as a heat source of steam generation.

The heat recovery steam generator 2 includes a high-pressure second superheater 11, a high-pressure first superheater 12, an attemperator 13, a second reheater 14, a first reheater 15, a reheated steam attemperator 16, a casing 17, a heat exchanger 18, an intermediate-pressure superheater 19, a high-pressure third economizer 20, a low-pressure superheater 21, an intermediate-pressure drum 22, an intermediate-pressure evaporator 23, an intermediate-pressure third economizer 24, a high-pressure second economizer 25, an intermediate-pressure second economizer 26, a low-pressure drum 27, a low-pressure evaporator 28, a high-pressure first economizer 29, an intermediate-pressure first economizer 30, a stack 50, a first intermediate-pressure feedwater system pipe 51, a second intermediate-pressure feedwater system pipe 52, and a first low-pressure feedwater system pipe 53.

These are disposed in the following order along the flow of the gas turbine exhaust supplied from the gas turbine plant 1 and flowing in the casing 17 of the heat recovery steam generator 2 toward the stack 50.

The high-pressure second superheater 11 and the high-pressure first superheater 12 which connect with the attemperator 13 are on an upstream side of the flow of the gas turbine exhaust in the casing 17. The second reheater 14 and the first reheater 15 which connect with the reheated steam attemperator 16 are between the high-pressure second superheater 11 and the high-pressure first superheater 12.

The high-pressure third economizer 20, the high-pressure second economizer 25, and the high-pressure first economizer 29 which connect with the heat exchanger 18 are provided downstream of the high-pressure first superheater 12. The heat exchanger 18, the high-pressure third economizer 20, the high-pressure second economizer 25, and the high-pressure first economizer 29 constitute a high-pressure feedwater system 60 of the heat recovery steam generator 2. The heat exchanger 18 also constitutes a once-through boiler 60a which is a second boiler.

The intermediate-pressure superheater 19, the intermediate-pressure evaporator 23, the intermediate-pressure third economizer 24, the second intermediate-pressure feedwater system pipe 52, the intermediate-pressure second economizer 26, the first intermediate-pressure feedwater system pipe 51, and the intermediate-pressure first economizer 30 which connect with the intermediate-pressure drum 22 are provided downstream of the high-pressure feedwater system 60. The intermediate-pressure drum 22, the intermediate-pressure superheater 19, the intermediate-pressure evaporator 23, the intermediate-pressure third economizer 24, the second intermediate-pressure feedwater system pipe 52, the intermediate-pressure second economizer 26, the first intermediate-pressure feedwater system pipe 51, and the intermediate-pressure first economizer 30 constitute an intermediate-pressure feedwater system 70 of the heat recovery steam generator 2. The low-pressure superheater 21, the first low-pressure feedwater system pipe 53, and the low-pressure evaporator 28 which connect with the low-pressure drum 27 are provided downstream of the intermediate-pressure feedwater system 70. The low-pressure drum 27, the low-pressure superheater 21, the first low-pressure feedwater system pipe 53, and the low-pressure evaporator 28 constitute a low-pressure feedwater system 80 of the heat recovery steam generator 2. The intermediate-pressure drum 22 and the intermediate-pressure evaporator 23, and the low-pressure drum 27 and the low-pressure evaporator 28, respectively constitute circulation boilers 70a, 80a which are first boilers.

In the high-pressure second superheater 11, steam generated in the heat exchanger 18 is turned into superheated steam, which is then supplied to a high-pressure steam turbine 31 of the steam turbine plant 3. Saturated steam evaporated in the intermediate-pressure evaporator 23 is separated into gas and water in the intermediate-pressure drum 22 to be supplied to an intermediate/low-pressure steam turbine 32 of the steam turbine plant 3. Saturated steam evaporated in the low-pressure evaporator 28 is separated into gas and water in the low-pressure drum 27 to be supplied to the intermediate/low-pressure steam turbine 32 of the steam turbine plant 3.

The steam turbine plant 3 includes the high-pressure steam turbine 31, the intermediate/low-pressure steam turbine 32, and a generator 33 whose shafts are coupled to one another. The steam supplied from the high-pressure second superheater 11 of the heat recovery steam generator 2 to the high-pressure steam turbine 31 through a main steam system 34 of the steam turbine plant 3 performs expansion work in the high-pressure steam turbine 31.

The steam turbine plant 3 further includes a low-temperature reheated steam system 35 connecting with the first reheater 15 of the heat recovery steam generator 2 and a high-temperature reheated steam system 36 connecting the second reheater 14 of the heat recovery steam generator 2 and the intermediate/low-pressure steam turbine 32. The turbine exhaust deprived of heat in the high-pressure steam turbine 31 is supplied to the first reheater 15 through the low-temperature reheated steam system 35. The turbine exhaust supplied to the first reheater 15 is reheated in the first reheater 15 and further reheated also in the second reheater 14, and thereafter is supplied to the intermediate/low-pressure steam turbine 32 to perform expansion work in the intermediate/low-pressure steam turbine 32.

Motive power (rotational torque) generated at the time of the expansion work in the high-pressure steam turbine 31 and the intermediate/low-pressure steam turbine 32 drives the generator 33. The intermediate/low-pressure steam turbine 32 includes a steam supply system 37 connecting with the low-pressure superheater 21 of the heat recovery steam generator 2, and is supplied with steam through the steam supply system 37.

The condensate and feedwater system 4 includes a condenser 38, a condensate pump 39, a gland condenser 40, a feed pump 41, a water-treating substance supply device 42, an intermediate/low-pressure feedwater system feed pipe 43 which is a first pipe, and a high-pressure feedwater system feed pipe 44 which is a second pipe. The turbine exhaust supplied from the intermediate/low-pressure steam turbine 32 of the steam turbine plant 3 is condensed to condensate in the condenser 38. This condensate passes through the condensate pump 39 and in the gland condenser 40, it is heat-exchanged with shaft seal water of the steam turbine plant 3 to be supplied to the feed pump 41.

The feed pump 41 supplies part of the feedwater through the intermediate/low-pressure feedwater system feed pipe 43 to the intermediate-pressure first economizer 30 of the intermediate-pressure feedwater system 70 provided in the heat recovery steam generator 2, and also supplies the rest of the feedwater to the high-pressure first economizer 29 of the high-pressure feedwater system 60 through the high-pressure feedwater system feed pipe 44. The feedwater supplied to the high-pressure first economizer 29 flows in the high-pressure feedwater system 60 to be supplied to the once-through boiler 60a. The feedwater supplied to the intermediate-pressure first economizer 30 is supplied to the intermediate-pressure second economizer 26 through the first intermediate-pressure feedwater system pipe 51 and thereafter is supplied to the intermediate-pressure third economizer 24 through the second intermediate-pressure feedwater system pipe 52. Thereafter, it is supplied to the circulation boiler 70a. Further, part of the feedwater flowing in the second intermediate-pressure feedwater system pipe 52 is supplied to the circulation boiler 80a provided in the low-pressure feedwater system 80, through the first low-pressure feedwater system pipe 53 connecting the second intermediate-pressure feedwater system pipe 52 and the low-pressure drum 27. Thus, the feedwater discharged from the feed pump 41 is supplied to the once-through boiler 60a of the high-pressure feedwater system 60 and the circulation boilers 70a, 80a of the intermediate-pressure feedwater system 70 and the low-pressure feedwater system 80.

Figure 2:
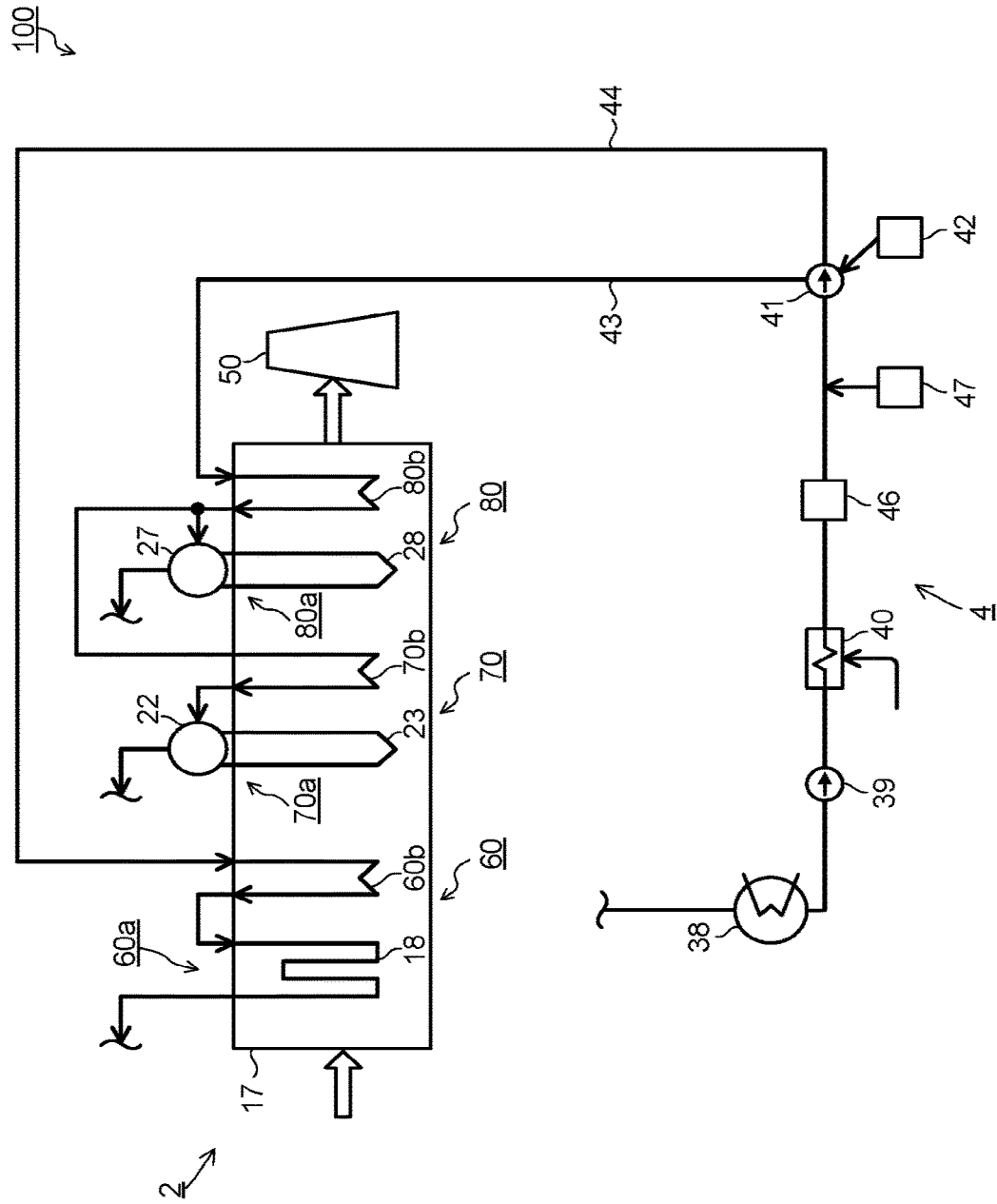
FIG. 2 is a system diagram schematically illustrating the feedwater system of the combined cycle power plant of the first embodiment.

FIG. 2 is a system diagram schematically illustrating the feedwater system 100 of the combined cycle power plant of the first embodiment. In the diagram of FIG. 2, the heat recovery steam generator 2 and the condensate and feedwater system 4 in FIG. 1 are illustrated in a simplified manner. As illustrated in FIG. 1 and FIG. 2, the feedwater system 100 of the combined cycle power plant includes: the feed pump 41 which supplies the feedwater to the heat recovery steam generator 2; the intermediate/low-pressure feedwater system feed pipe 43 connecting an intermediate stage, which is a flow path in mid-course of pressurization of the feed pump 41, with the low-pressure feedwater system 80 and the intermediate-pressure feedwater system 70; the circulation boilers 70a, 80a which are supplied with the feedwater led into the intermediate/low-pressure feedwater system feed pipe 43 and subjected to first water treatment; the high-pressure feedwater system feed pipe 44 connecting an outlet of the feed pump 41 and the high-pressure feedwater system 60; the once-through boiler 60a supplied with the feedwater led into the high-pressure feedwater system feed pipe 44 and subjected to second water treatment at a position more downstream than the intermediate stage which is the flow path in mid-course of the pressurization of the feed pump 41; and the water-treating substance supply device 42 which supplies a water-treating substance to the feed pump 41.

The intermediate/low-pressure feedwater system feed pipe 43 connects with the feed pump 41 so as to communicate with the intermediate stage of the feed pump 41. That is, the intermediate/low-pressure feedwater system feed pipe 43 extracts part of the feedwater from the intermediate stage of the feed pump 41, and the feedwater is pre-heated in a low-pressure economizer 80b in the low-pressure feedwater system 80 and is thereafter supplied to the circulation boiler 80a. Further, the feedwater diverging from the low-pressure economizer 80b is pre-heated in an intermediate-pressure economizer 70b in the intermediate-pressure feedwater system 70 and is thereafter supplied to the circulation boiler 70a. The intermediate stage of the feed pump 41 is located more downstream than an inlet of the feed pump 41 to which the condensate is supplied from the condensate pump 39 and more upstream than the outlet of the feed pump 41 from which the feedwater is discharged.

The high-pressure feedwater system feed pipe 44 connects with the feed pump 41 so as to communicate with the outlet of the feed pump 41. The feed pump 41 discharges the rest of the feedwater from its outlet to the high-pressure feedwater system feed pipe 44. The feedwater flowing in the high-pressure feedwater system feed pipe 44 is pre-heated in a high-pressure economizer 60b in the high-pressure feedwater system 60 and is thereafter supplied to the once-through boiler 60a.

The intermediate/low-pressure feedwater system feed pipe 43 connects with the intermediate stage of the feed pump 41. Accordingly, a supply pressure of the feedwater supplied from the outlet of the feed pump 41 to the once-through boiler 60a through the high-pressure feedwater system feed pipe 44 is higher than a supply pressure of the feedwater supplied to the circulation boiler 70a through the intermediate/low-pressure feedwater system feed pipe 43.

The water-treating substance supply device 42 supplies the water-treating substance for the second water treatment to the feedwater flow path in the feed pump 41 at a position of the feed pump 41 more downstream than a position where the intermediate/low-pressure feedwater system feed pipe 43 is connected and more upstream than a position where the high-pressure feedwater system feed pipe 41 is connected. The position of the feed pump 41 where the intermediate/low-pressure feedwater system feed pipe 43 is connected is the intermediate stage of the feed pump 41, and the position of the feed pump 41 where the high-pressure feedwater system feed pipe 44 is connected is the outlet of the feed pump 41.

The water-treating substance is supplied to the feedwater flow path in the feed pump 41 from the position more downstream than the intermediate stage of the feed pump 41 which is the connection position of the feed pump 41 and the intermediate/low-pressure feedwater system feed pipe 43. That is, the connection position of the feed pump 41 and the intermediate/low-pressure feedwater system feed pipe 43 is more upstream than the supply position at which the water-treating substance is supplied to the feed pump 41 from the water-treating substance supply device 42. Accordingly, the water-treating substance supplied from the water-treating substance supply device 42 does not flow into the intermediate/low-pressure feedwater system feed pipe 43.

Thus, the water-treating substance supplied from the water-treating substance supply device 42 to the feedwater flow path in the feed pump 41 is not supplied to the circulation boilers 70a, 80a provided in the intermediate-pressure feedwater system 70 and the low-pressure feedwater system 80. In other words, the total amount of the water-treating substance supplied to the feed pump 41 from the water-treating substance supply device 42 is supplied to the once-through boiler 60a provided in the high-pressure feedwater system 60. Therefore, in the feedwater system 100 of the combined cycle power plant, water treatment using the water-treating substance supplied from the water-treating substance supply device 42 can be applied to the high-pressure feedwater system 60, but not to the intermediate-pressure feedwater system 70 and the low-pressure feedwater system 80.

The water-treating substance is appropriately selected according to the kind of the water treatment of the feedwater supplied to the high-pressure feedwater system 60, and an example thereof is oxygen. The structure of the water-treating substance supply device 42 is appropriately selected according to the kind of the water-treating substance or the design of the feedwater system 100 of the combined cycle power plant, and includes a tank or a cylinder storing the water-treating substance and a device which manufactures the water-treating substance. Further, the water-treating substance supply device 42 may have a function of adjusting a supply pressure of the water-treating substance to the feed pump 41, and the supply pressure is appropriately adjusted according to a water-treatment condition.

Where the water-treating substance supplied from the water-treating substance supply device 42 to the feed pump 41 is oxygen, the oxygen is supplied to neither the intermediate-pressure feedwater system 70 nor the low-pressure feedwater system 80 but is supplied to the high-pressure feedwater system 60. Accordingly, in the feedwater system 100 of the combined cycle power plant, oxygen treatment can be performed in the high-pressure feedwater system 60 including the once-through boiler 60a. At this time, the oxygen treatment is performed in neither the intermediate-pressure feedwater system nor the low-pressure feedwater system 80 not supplied with the oxygen.

The feedwater system 100 of the combined cycle power plant may further include a demineralizer 46 between a position downstream of the gland condenser 40 and a position upstream of the feed pump 41. The demineralizer 46 demineralizes the condensate which is to be supplied to the feed pump 41 from the condenser 38. The demineralization of the condensate by the demineralizer 46 removes corrosive substances such as iron oxide, a metallic substance, and chlorine ions contained in the condensate to highly purify the condensate. The demineralizer 46 includes, for example, an ion-exchange resin.

In the feedwater system 100 of the combined cycle power plant, a water quality adjusting device 47 which supplies a pH adjusting agent may be provided between a position downstream of the gland condenser 40 and a position upstream of the feed pump 41, for example, at a position downstream of the demineralizer 46. The water quality adjusting device 47 supplies the pH adjusting agent to the condensate highly purified by the demineralizer 46 to adjust the water quality of the condensate. The pH adjusting agent supplied to the condensate from the water quality adjusting device 47 is capable of adjusting pH of the condensate to a desired value. Examples of the pH adjusting agent include a basic substance such as ammonia.

The demineralization treatment by the demineralizer 46 and the water quality treatment by the water quality adjusting device 47 are applicable to the high-pressure feedwater system 60, the intermediate-pressure feedwater system 70, and the low-pressure feedwater system 80 unlike the water treatment by the water-treating substance supply device 42.

For example, in the feedwater system 100 of the combined cycle power plant, CWT (Combined Water Treatment) can be performed in the high-pressure feedwater system 60 including the once-through boiler 60a, using the basic substance supplied from the water quality adjusting device 47 and the oxygen supplied from the water-treating substance supply device 42, and the all volatile treatment can be performed in the intermediate-pressure feedwater system 70 and the low-pressure feedwater system 80 including the circulation boilers 70a, 80a, using the basic substance supplied from the water quality adjusting device 47. At this time, the basic substance supplied from the water quality adjusting device 47 makes the condensate alkalescent.

Next, the operation of the feedwater system 100 in the combined cycle power plant will be described.

As illustrated in FIG. 1 and FIG. 2, the turbine exhaust supplied from the intermediate/low-pressure steam turbine 32 is condensed to the condensate in the condenser 38. The condensate whose dissolved oxygen is reduced in the condenser 38 is led to the feed pump 41 by the condensate pump 39. While the condensate is led to the feed pump 41, the condensate is heat-exchanged with the shaft seal water of the steam turbine plant 3 by the gland condenser 40 and is demineralized by the demineralizer 46, and thereafter the pH adjusting agent is supplied to the condensate from the water quality adjusting device 47. For example, ammonia is supplied to the condensate from the water quality adjusting device 47 to make the condensate alkalescent.

Part of the alkalescent feedwater which has been highly purified is led to the intermediate/low-pressure feedwater system feed pipe 43 which connects with the feed pump 41 at the position more upstream than the supply position of the water-treating substance supply device 42. The feedwater flowing in the intermediate/low-pressure feedwater system feed pipe 43 is supplied to the circulation boilers 70a, 80a provided in the intermediate-pressure feedwater system 70 and the low-pressure feedwater system 80. Then, the all volatile treatment is performed in the intermediate-pressure feedwater system 70 and the low-pressure feedwater system 80.

More downstream than the intermediate stage of the feed pump 41, the water-treating substance, for example, oxygen is supplied to the rest of the feedwater from the water-treating substance supply device 42. At this time, the total amount of the oxygen supplied from the water-treating substance supply device 42 flows in the high-pressure feedwater system feed pipe 44. That is, the oxygen does not flow to the intermediate/low-pressure feedwater system feed pipe 43. The rest of the alkalescent feedwater containing the oxygen is supplied to the once-through boiler 60a provided in the high-pressure feedwater system 60, from the outlet of the feed pump 41 through the high-pressure feedwater system feed pipe 44. Then, the combined water treatment is performed in the high-pressure feedwater system 60.

As described above, according to the feedwater system 100 of the combined cycle power plant of the first embodiment, it is possible to apply different water treatment methods to the respective feedwater systems of the heat recovery steam generator 2, since the water-treating substance supplied from the water-treating substance supply device 42 is supplied to the high-pressure feedwater system 60 without being supplied to the intermediate-pressure feedwater system 70 and the low-pressure feedwater system 80. Further, in the feedwater system 100 of the combined cycle power plant, the water treatment can be performed in each of the feedwater systems of the heat recovery steam generator 2 according to the kind of each of the feedwater systems of the heat recovery steam generator 2. Therefore, the feedwater system 100 of the combined cycle power plant is capable of improving maintainability of the combined cycle power plant, enabling the long-term stable operation of the combined cycle power plant.

Further, the supply pressure of the water-treating substance supply device 42 is usually lower than a water pressure in the high-pressure feedwater system 60. This necessitates a compressor for increasing the supply pressure of the water-treating substance supply device 42 when the water-treating substance supply device 42 supplies the water-treating substance directly to the high-pressure feedwater system 60 not through the feed pump 41. On the other hand, in the feedwater system 100 of the combined cycle power plant, the water-treating substance supply device 42 supplies the water-treating substance to the high-pressure feedwater system 60 through the feed pump 41. This eliminates the need for the compressor for increasing the supply pressure of the water-treating substance supply device 42, enabling a reduction of a manufacturing cost of the feedwater system 100 of the combined cycle power plant.

Incidentally, in the feedwater system 100 of the combined cycle power plant of the first embodiment, the demineralizer 46 is between the gland condenser 40 and the feed pump 41, but the demineralizer 46 may be between the condensate pump 39 and the gland condenser 40. Further, in the feedwater system 100 of the combined cycle power plant of the first embodiment, the water quality adjusting device 47 is between the gland condenser 40 and the feed pump 41, but the water quality adjusting device 47 may be between the condensate pump 39 and the gland condenser 40, or between the condenser 38 and the condensate pump 39.

Second Embodiment

Figure 3:
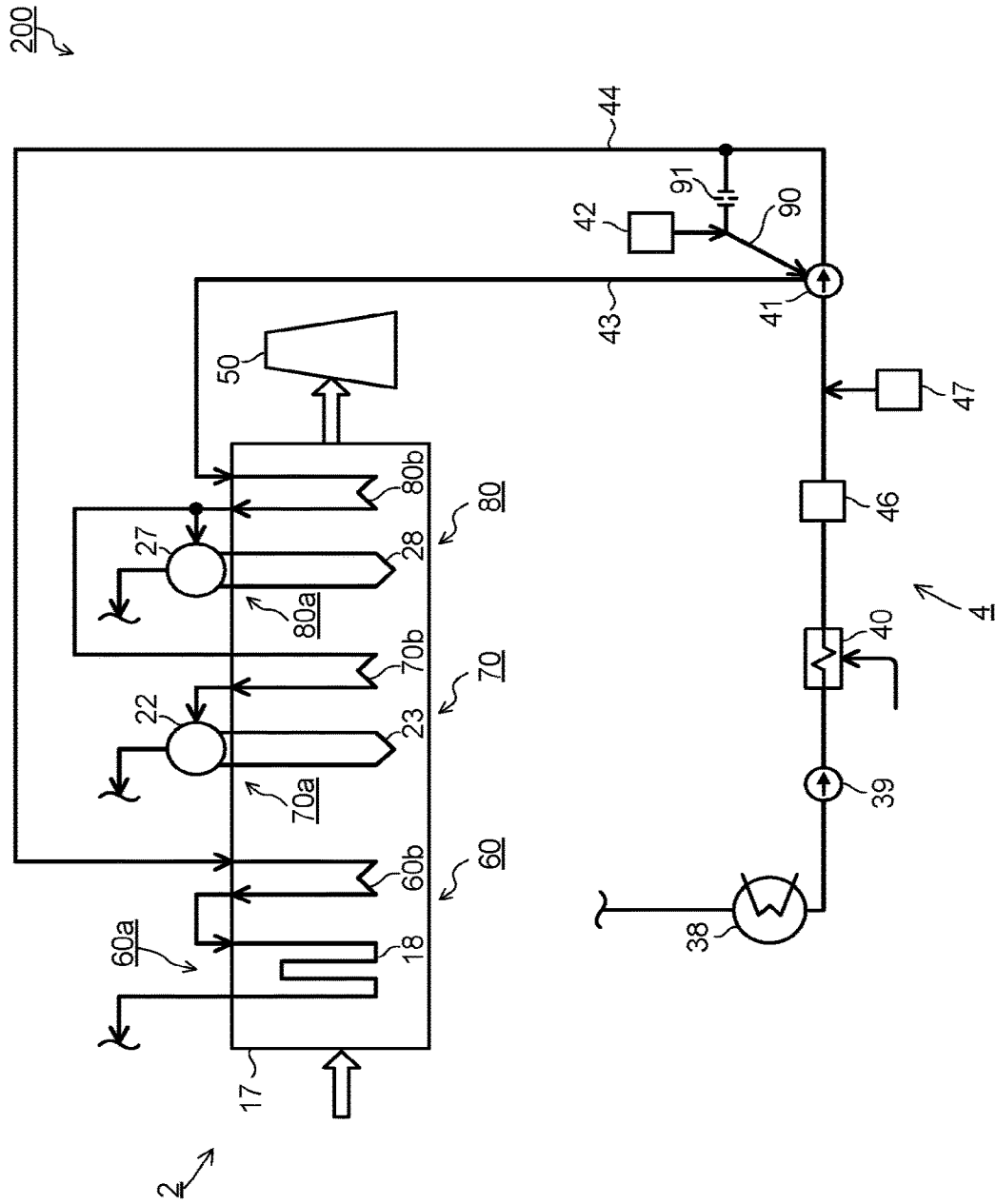
FIG. 3 is a system diagram schematically illustrating a feedwater system of a combined cycle power plant of a second embodiment.

FIG. 3 is a system diagram schematically illustrating a feedwater system 200 of a combined cycle power plant of a second embodiment. In the following embodiment, the same components as those of the feedwater system 100 of the combined cycle power plant of the first embodiment are denoted by the same reference signs, and redundant description thereof will be omitted or simplified.

The structure of the feedwater system 200 of the combined cycle power plant of the second embodiment is basically the same as the structure of the feedwater system 100 of the combined cycle power plant of the first embodiment except in that the structure of its water-treating substance supply device 42 is different and it additionally includes a feed pipe 90 which is a third pipe and a supply pressure adjusting device 91. Here, the different structures will be mainly described.

As illustrated in FIG. 3, the feedwater system 200 of the combined cycle power plant of the second embodiment includes a feed pump 41, an intermediate/low-pressure feedwater system feed pipe 43, circulation boilers 70a, 80a, a high-pressure feedwater system feed pipe 44, a once-through boiler 60a, the feed pipe 90, which is the third pipe, connecting the high-pressure feedwater system feed pipe 44 and the feed pump 41, the water-treating substance supply device 42 which is provided to the feed pipe 90 and supplies a water-treating substance to the feed pump 41 through the feed pipe 90, and the supply pressure adjusting device 91 provided in the feed pipe 90.

The feed pipe 90 diverges from the high-pressure feedwater system feed pipe 44 provided downstream of the feed pump 41 and upstream of a high-pressure feedwater system 60 and connects with the feed pump 41. The feed pipe 90 and the feed pump 41 connect with each other at a position more downstream than an intermediate stage of the feed pump 41 and more upstream than an outlet of the feed pump 41. Part of feedwater discharged from the feed pump 41 to the high-pressure feedwater system feed pipe 44 is supplied to the once-through boiler 60a provided in the high-pressure feedwater system 60, and the rest of the feedwater is supplied again to the feed pump 41 through the feed pipe 90.

The water-treating substance supply device 42 supplies the water-treating substance to the feed pipe 90. The water-treating substance supplied to the feed pipe 90 is led to a feedwater flow path in the feed pump 41 together with the feedwater.

The supply pressure adjusting device 91 adjusts a supply pressure $P_3$ of a mixed solution of the water-treating substance and the feedwater which are to be supplied from the feed pipe 90 to the feed pump 41. For example, the supply pressure adjusting device 91 is provided more upstream than a supply position of the water-treating substance from the water-treating substance supply device 42 to the feed pipe 90. The supply pressure adjusting device 91 is an orifice or a valve, for instance.

Figure 4:
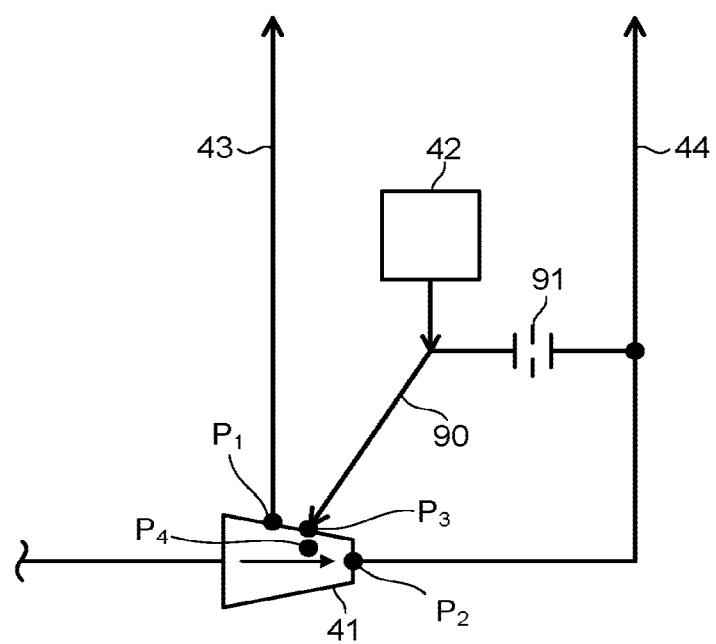
FIG. 4 is a schematic diagram schematically illustrating an example of a feed pump.
Figure 5:
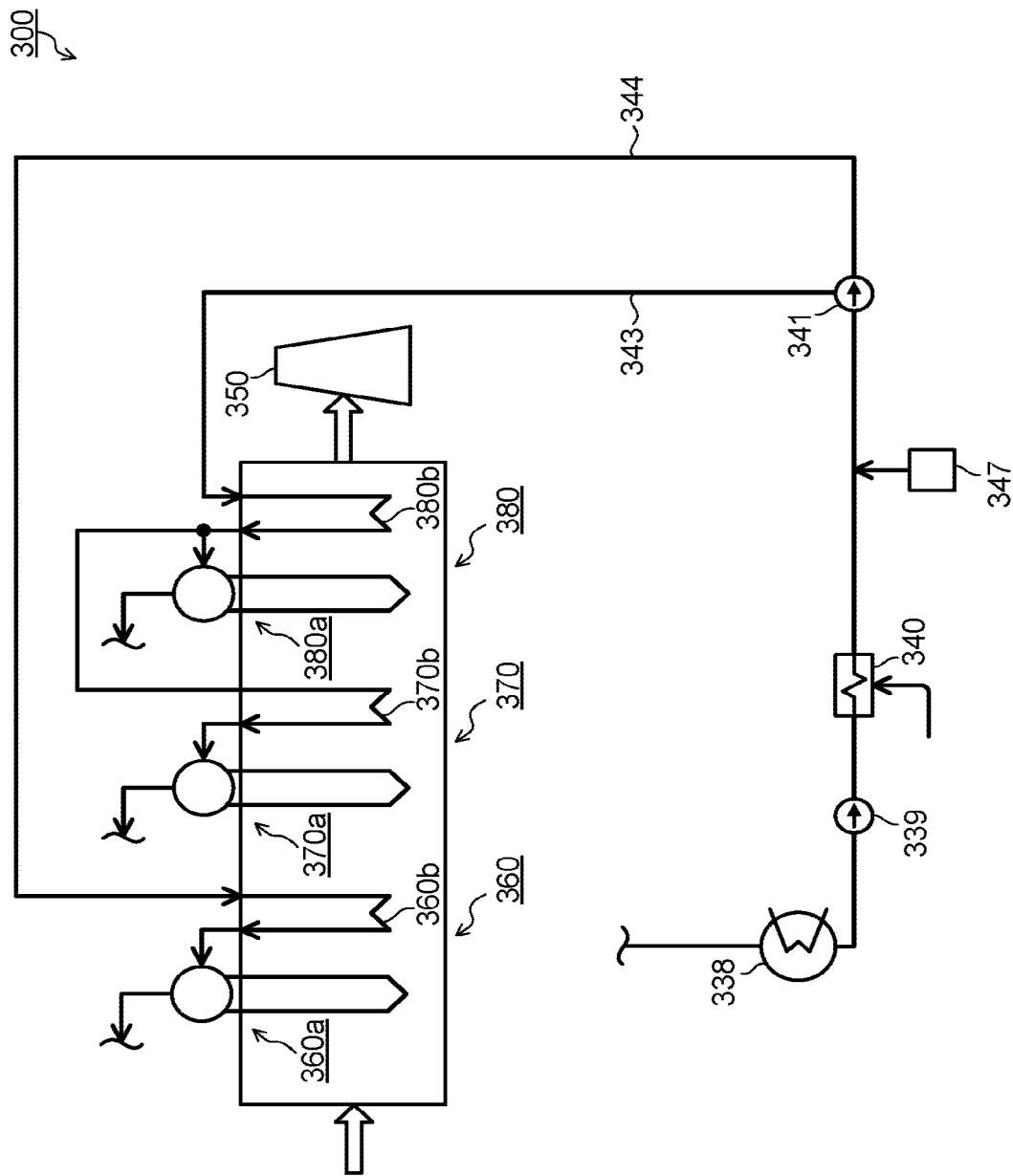
FIG. 5 is a system diagram schematically illustrating a feedwater system of a conventional combined cycle power plant.

FIG. 4 is a schematic diagram schematically illustrating an example of the feed pump 41. Here, $P_1$ is a discharge pressure of the feedwater extracted from the feed pump 41 to the intermediate/low-pressure feedwater system feed pipe 43. $P_2$ is a discharge pressure of the feedwater discharged from the feed pump 41 to the high-pressure feedwater system feed pipe 44. $P_3$ is the supply pressure of the mixed solution of the water-treating substance and the feedwater which are supplied from the feed pipe 90 to the feed pump 41. $P_4$ is a water pressure of the feedwater in the feed pump 41 at the connection position of the feed pump 41 and the feed pipe 90. Here, an example where the feed pump 41 is an axial-flow pump is illustrated, but the feed pump 41 is not limited to the axial-flow pump, as long as the later-described $P_1<P_4<P_3<P_2$ is satisfied. 100601 As illustrated in FIG. 4, the intermediate stage of the feed pump 41 connects with the intermediate/low-pressure feedwater system feed pipe 43, and part of the feedwater is discharged to the intermediate/low-pressure feedwater system feed pipe 43 with the discharge pressure $P_1$. The outlet of the feed pump 41 connects with the high-pressure feedwater system feed pipe 44, and the rest of the feedwater is discharged to the high-pressure feedwater system feed pipe 44 with the discharge pressure $P_2$. Here, because of the structure of the feed pump 41, $P_1<P_2$. Further, the position of the feed pump 41 more downstream than its intermediate stage and more upstream than its outlet connects with the feed pipe 90, and the mixed solution of the water-treating substance and the feedwater is supplied to the feed pump 41 with $P_3$. Then, the supply pressure adjusting device 91 adjusts $P_3$, so that $P_4<P_3<P_2$ is satisfied. In more detail, $P_1<P_4<P_3<P_2$ is satisfied. Under the condition where $P_1<P_4<P_3<P_2$ is satisfied, the water-treating substance and the feedwater which flow in the feed pipe 90 are supplied to the feed pump 41 even if, for example, they are not pressurized by an additional pump different from the feed pump 41.

Next, the operation of the feedwater system 200 in the combined cycle power plant will be described.

As illustrated in FIG. 3 and FIG. 4, part of the feedwater is led to the intermediate/low-pressure feedwater system feed pipe 43 with the discharge pressure $P_1$. The rest of the feedwater is discharged to the high-pressure feedwater system feed pipe 44 with the discharge pressure $P_2$. The mixed solution of the water-treating substance supplied from the water-treating substance supply device 42 and the feedwater having diverged from the high-pressure feedwater system feed pipe 44 is supplied from the feed pipe 90 to the feed pump 41 with the supply pressure $P_3$. At this time, the supply pressure adjusting device 91 adjusts the supply pressure $P_3$ to satisfy the relation of $P_1<P_4<P_3<P_2$. Therefore, the water-treating substance is supplied to the feed pump 41 through the feed pipe 90 from the water-treating substance supply device 42 even if an additional pump different from the feed pump 41 is not provided in the feed pipe 90.

As described above, according to the feedwater system 200 of the combined cycle power plant of the second embodiment, the supply pressure adjusting device 91 adjusts the supply pressure $P_3$ to satisfy the relation of $P_1<P_4<P_3<P_2$. Accordingly, the water-treating substance supplied from the water-treating substance supply device 42 to the feed pipe 90 together with the feedwater flowing in the feed pipe 90 can be led to the feed pump 41, even if an additional pump different from the feed pipe 41 does not pressurize the water-treating substance and the feedwater which flow in the feed pipe 90. Therefore, even when it is difficult for the water-treating substance supply device 42 to supply the water-treating substance to the feed pump 41, the water-treating substance supply device 42 is capable of supplying the water-treating substance to the feed pump 41 through the feed pipe 90, without an unnecessary pump being provided in the feedwater system 200 of the combined cycle power plant.

According to the above-described embodiments, it is possible to provide a feedwater system of a combined cycle power plant in which different water treating methods are applicable to respective feedwater systems of a heat recovery steam generator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A feedwater system of a combined cycle power plant including: a gas turbine plant, a heat recovery steam generator which generates steam by using heat of exhaust of the gas turbine plant; and a steam turbine plant which is driven by the steam generated by the heat recovery steam generator, the feedwater system comprising:
   a feed pump which supplies feedwater to the heat recovery steam generator, the feed pump having a flow path for the feedwater, the flow path having an outlet;
   a first pipe which extracts part of the feedwater from the flow path of the feed pump upstream of the outlet;
   a first boiler which is in the heat recovery steam generator and supplied with the feedwater led into the first pipe and subjected to a first water treatment;
   a second pipe where the feedwater discharged discharges from the outlet of the follow flow path of the feed pump;
   a second boiler which is in the heat recovery steam generator and supplied with the feedwater led into the second pipe and subjected to a second water treatment being different from the first water treatment;
   a water-treating substance supply device which supplies a water-treating substance for the second water treatment to the flow path of the feedwater in the feed pump at a position of the flow path of the feed pump downstream of the first pipe and upstream of the outlet;
   a third pipe which connects the second pipe and the feed pump and leads part of the feedwater flowing in the second pipe to the feed pump; and
   a supply pressure adjusting device which is in the third pipe and adjusts a supply pressure of a mixed solution of the water-treating substance and the feedwater which are to be supplied to the feed pump from the third pipe, wherein:

the water-treating substance supply device is provided to the third pipe; and $P_1<P_4<P_3<P_2$ is satisfied, where $P_1$ is a first discharge pressure of the feedwater extracted from the feed pump to the first pipe, $P_2$ is a second discharge pressure of the feedwater discharged from the feed pump to the second pipe, $P_3$ is the supply pressure of the mixed solution of the water-treating substance and the feedwater which are supplied to the feed pump from the third pipe, and $P_4$ is a water pressure of the feedwater in the feed pump at a connection position of the third pipe and the feed pump.

2. The feedwater system of the combined cycle power plant of claim 1, wherein a total amount of the water-treating substance supplied to the feed pump from the water-treating substance supply device is supplied to the second boiler.

3. The feedwater system of the combined cycle power plant of claim 1, wherein:

the first boiler is a circulation boiler;

the second boiler is a once-through boiler;

the first water treatment applied to the feedwater which is to be supplied to the circulation boiler is treatment of supplying a pH adjusting agent to the feedwater; and the second water treatment applied to the feedwater which is to be supplied to the once-through boiler is treatment of supplying oxygen as the water-treating substance to the feedwater.

4. The feedwater system of the combined cycle power plant of claim 1, the first water treatment, further comprising a water quality adjusting device which is provided upstream of the feed pump and supplies a pH adjusting agent to condensate which is supplied to the feed pump.

5. The feedwater system of the combined cycle power plant of claim 2, wherein:

the first boiler is a circulation boiler;

the second boiler is a once-through boiler;

the first water treatment applied to the feedwater which is to be supplied to the circulation boiler is treatment of supplying a pH adjusting agent to the feedwater; and the second water treatment applied to the feedwater which is to be supplied to the once-through boiler is treatment of supplying oxygen as the water-treating substance to the feedwater.

6. The feedwater system of the combined cycle power plant of claim 2, the first water treatment further comprising a water quality adjusting device which is provided upstream of the feed pump and supplies a pH adjusting agent to condensate which is supplied to the feed pump.

7. The feedwater system of the combined cycle power plant of claim 3, further comprising a water quality adjusting device which is provided upstream of the feed pump and supplies a pH adjusting agent to condensate which is to be supplied to the feed pump as the first water treatment.

* * * * *